United States Patent Office 3,296,220
Patented Jan. 3, 1967

3,296,220
PRODUCTION OF POLYMERS OF ETHYLENICAL-
LY UNSATURATED MONOMERIC COMPOUNDS
Ernst-Guenther Kastning, Assenheim, Pfalz, Herbert
Naarmann and Christoph Berding, Ludwigshafen
(Rhine), and Hermann Reis, Limburgerhof, Pfalz, Germany, assignors to Badische Anilin- & Soda-Fabrik
Aktiengesellschaft, Ludwigshafen (Rhine), Germany
No Drawing. Filed Aug. 15, 1963, Ser. No. 302,476
Claims priority, application Germany, Aug. 25, 1962,
B 68,568
6 Claims. (Cl. 260—78.5)

This invention concerns a new process for the production of polymers of ethylenically unsaturated monomeric compounds. More specifically the invention concerns a process for the production of polymers of ethylenically unsaturated compounds in which novel catalysts are employed.

It is known that ethylenically unsaturated compounds polymerize in the presence of certain catalysts according to an anionic reaction mechanism. Two groups of catalysts can be used for this reaction, namely (1) organometallic compounds or alkali metals and (2) combined catalysts consisting of a compound of a transition metal and an organometallic compound.

These catalysts are sensitive to air and water and they are dangerous to handle on account of the fact, for example, that they ignite spontaneously in air. A further disadvantage in the use of these catalysts is that the monomers require extensive purification before the polymerization in order to free them from water.

It has already been proposed to use chelate complex compounds of metals of groups IV to VIII of the Periodic System of Elements (Handbook of Chemistry and Physics, 38th edition, 394–395, Chemical Rubber Publishing Co., Cleveland, Ohio), as initiators for the polymerization of ethylenically unsaturated monomeric polymerizable compounds.

An object of this invention is to provide a process for the production of homopolymers and copolymers of ethylenically unsaturated monomeric polymerizable compounds in which it is unnecessary to subject the monomers to special purification. A further object of the invention is to provide a polymerization process involving the use of catalysts which do not ignite spontaneously. An additional object of the invention is to provide particularly effective polymerization catalysts for use in the process.

These objects are achieved in accordance with this invention by using mixtures containing:

(a) At least one metal chelate compound of a metal of groups IVB, VA, VB, VIB, VIIB and VIII of the Periodic System, and (b) At least one aliphatic, aromatic or heterocyclic chlorine, bromine or iodine compound having one to twelve carbon atoms.

The process according to this invention may be used for the polymerization of ethylenically unsaturated monomeric polymerizable compounds such as α-olefines, vinylaromatic compounds such as styrene, halostyrenes, styrenesulfonic acid, α,β-unsaturated carboxylic acids, such as acrylic acid, methacrylic acid, esters of acrylic acid with alcohols having one to eight carbon atoms, such as methyl acrylate, ethyl acrylate, n-butyl acrylate, esters of methacrylic acid with alcohols having one to eight carbon atoms, such as methyl methacrylate and tertiary-butyl methacrylate, vinyl esters of alcohols having one to ten carbon atoms, such as vinyl acetate, vinyl propionate, vinyl benzoate, vinyl ethers of alcohols having one to four carbon atoms, such as vinyl methyl ether and vinyl n-butyl ether, vinyl chloride, vinylidene chloride, nitriles and amides of α,β-unsaturated carboxylic acids, such as acrylonitrile, methacrylonitrile, acrylamide, methacrylamide, vinyl ketones having four to seven carbon atoms, such as methyl vinyl ketone and isopropenyl vinyl ketone, N-vinyl compounds, such as vinylpyrrolidone, vinyl caprolactam, vinylimidazole and vinylcarbazole, fumaric acid, maleic acid, maleic anhydride, maleic imide, esters of maleic acid with alcohols having one to six carbon atoms, such as diethyl maleate, dimethyl maleate, di-n-butyl maleate and the corresponding esters of fumaric acid.

The process is particularly advantageous for the polymerization of α-olefines having two to ten carbon atoms and one or two olefinic double bonds, such as α-olefines having two to four carbon atoms and a single double bond, as for example ethylene, propylene, n-butylene-(1), isobutylene and vinyl aromatic compounds, such as styrene, α-methylstyrene and 2-, 3- or 4-methylstyrene, and also α-olefines having two double bonds, such as butadiene-1,3, isoprene, 2 - phenylbutadiene - 1,3 and 2,3 - dimethylbutadiene-(1,3). The process according to the invention can also be used for the production of copolymers of α-olefines and copolymers of α-olefines with other ethylenically unsaturated monomeric polymerizable compounds. Copolymers of α-olefines are defined as polymers which contain at least 50% by weight of α-olefines in polymerized form.

Metal chelate compounds are defined as compounds in which a metal atom is linked to two functional groups of a molecule by main valencies and coordinate bonds. Compounds of this type are for example described in the book "Chemistry of the Metal Chelate Compounds" by Arthur E. Martell and Melvin Calvin, New York, Prentice-Hall, Inc., 1952.

Compounds suitable for the formation of metal chelate compounds (a) which contain two functional groups capable of becoming linked with metal atoms, one group being linked by main valencies and the other by coordinate bonds, are particularly β-diketones, such as acetylacetone, β-ketocarboxylic esters, such as ethyl acetoacetate and propyl acetoacetate, and also diacetoacetic esters, for example the ethyl ester, amino acids having two to six carbon atoms, such as glycine and histidine, hydroxyaldehydes, such as salicylaldehyde, dialdehydes, such as chloromalonodialdehyde, and also o-aminophenol, o-aminobenzoic acid or 2,2′-hydroxyazobenzene.

Mixtures of the acetylacetonates and β-ketocarboxylic esters of metals of the groups of the Periodic System referred to above with the aliphatic, aromatic or heterocyclic chlorine, bromine or iodine compounds are particularly suitable for use as polymerization catalysts for ethylenically unsaturated monomeric polymerizable compounds.

The metal chelate compounds are illustrated by the following formula for an acetylacetonate:

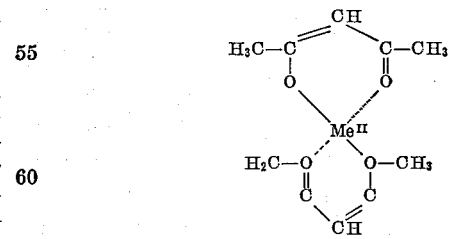

in which Me$^{II}$ represents a divalent metal from the groups referred to above. Me may also be monovalent, trivalent or have a higher polyvalency.

Examples of suitable aliphatic, aromatic or heterocyclic chlorine, bromine or iodine compounds having one to twelve carbon atoms (b) which may be used in admixture with the metal chelate compounds (a) as polymerization catalysts are: monohalogenated and polyhalogenated aliphatic hydrocarbons, such as methylene chloride, chloroform, bromoform, iodoform, carbon tetrachloride, ethyl bromide, ethyl iodide, n-butyl chloride, n-butyl bromide, tertiary-butyl chloride, n-amyl chloride, isoamyl chloride, n-lauryl chloride, 1,2-dichloroethane, 1,4-dichlorobutane, 1,4-dichlorobutene-2, 1,1',2,2'-tetrachloroethane, hexachloroethane, 1,2-dichloroethylene, tetrachloroethylene, cyclohexyl chloride, cyclohexyl bromide, chlorobenzene, bromobenzene, iodobenzene, xylylene dichloride, o-, m- and p-dichlorobenzene, sym.-trichlorobenzene, hexachlorobenzene, hexachlorocyclohexane, and also 2-amino-5-iodopyrimidine, cyanuric chloride, chloropyridines, and also halogenated carboxylic acids and their derivatives, halogenated alcohols, ketones and ethers, such as chloroacetic acid, α-bromocaproic acid, α-bromoacetophenone and pentachloropropanol.

The metal chelate compounds (a) are used in amounts between 0.001 and 5, preferably between 0.01 and 1% by weight with reference to the monomeric compounds.

From 0.01 to 50 parts of one or more aliphatic, aromatic or heterocyclic chlorine, bromine or iodine compounds having one to twelve carbon atoms (b) is used for each part of one or more metal chelate compounds (a).

Sometimes it is advantageous to heat the mixture of metal chelate compound and organic halogen compound for some time prior to the use of the mixture as a polymerization catalyst.

Monomers which cannot be copolymerized or can only be copolymerized incompletely with prior art catalysts can be copolymerized with the catalyst mixtures to be used according to the present invention. For example it is possible to copolymerize butadiene with ethylene, butadiene with acrylic acid, ethylene with vinyl ethers, propylene with acrylic acid, and styrene with ethylene in practically any ratio by the process according to this invention.

Some of the polymers have a sterically ordered structure; for example polyethylene prepared according to the invention has a high crystalline fraction. The density is more than 0.95. In the polymerization of dienes, the 1,4-cis- and 1,4-trans-linkage is favoured. The molecular weights of the polymers obtained may vary within a wide range according to the polymerization conditions.

Polymerization may be carried out at between 0° and 200° C. The temperature which is to be preferred depends on the monomers to be polymerized. Thus ethylene is preferably homopolymerized or copolymerized at 50° to 150° C., and styrene, butadiene and isoprene are preferably homopolymerized or copolymerized at 20° to 130° C. Any pressure may be used, if desired up to about 4000 atmospheres gauge or more.

Monomers may be homopolymerized and copolymerized in bulk with the catalyst mixtures to be used according to the invention. Sometimes it may also be advantageous to dissolve or suspend the monomers in inert auxiliary liquids for the polymerization. Such auxiliary liquids are for example aliphatic, cycloaliphatic and aromatic hydrocarbons, such as n-pentane, n-hexane, isohexane, n-heptane, n-octane, isooctane, cyclohexane, methylcyclohexane, benzene, toluene, o-xylene, m-xylene, p-xylene, ethylbenzene, cumene, isopropylbenzene, tetrahydronaphthalene or decahydronaphthalene. Ethers, such as diethyl ether, dibutyl ether, tetrahydrofuran, dioxane, glycol dimethyl ether or glycol phenylmethyl ether, and also alcohols and ketones, such as methanol, ethanol, propanol, isopropanol, butanols, cyclohexanol, benzyl alcohol, and acetone, are also suitable.

The polymerization may be carried out continuously or batchwise. In continuous polymerization, the initiator mixture may be introduced into the reactor in admixture with the monomers or with an auxiliary liquid.

The mixtures of metal chelate compounds and organic chlorine, bromine or iodine compounds may be contacted with the monomers by various methods. For example they may be suspended or dissolved in the monomers or in solutions or suspensions of the monomers.

The mixtures of metal chelate compounds of the metals of groups IVB, VA, VB, VIB, VIIB and VIII of the Periodic System with organic chlorine, bromine or iodine compounds have a better activity than the pure metal chelate compounds. Thus for example higher rates of polymerization and higher yields are obtained with these mixtures. Furthermore the polymerization may be at considerably lower temperatures at which in some cases the metal chelate compounds alone are practically inactive.

The organic halogen compounds act as co-catalysts but are inactive by themselves as polymerization catalysts.

The invention is illustrated by the following examples in which parts are by weight. The K-values are determined by the method of H. Fikentscher, "Cellulosechemie," volume 13 (1932), 58.

EXAMPLE 1

A number of mixtures, each consisting of 20 parts of styrene, 0.1 part of a chelate complex compound and 0.01 part of carbon tetrachloride are heated for two hours at temperatures between 100° and 120° C. The polymers obtained are then precipitated in methanol. The K-values are measured in 1% solution in cyclohexanone. The results are collected in Table 1. For comparison, styrene is polymerized under the same conditions but only with the chelate complex compound. The results obtained are indicated in parentheses in the table. In the table T denotes the reaction temperature in ° C., Y denotes the yield in parts, C denotes the percentage conversion and K denotes the K-value.

Table 1

| Metal chelate complex compound | T | Y | C | K |
|---|---|---|---|---|
| Manganic acetylacetonate | 100 | 17.0 (4.9) | 85 (24.5) | 79.5 (68) |
| Manganic anthranilate | 100 | 18.2 (6.2) | 91 (31) | 81 (72) |
| Manganic acetoacetic ethyl ester | 100 | 9.6 (5.8) | 98 (29) | 80.5 (71) |
| Cobaltic acetylacetonate | 110 | 18.1 (—) | 90.5 (—) | 54 (—) |
| Cobaltic histidinate | 110 | 7.2 (1.2) | 86 (6) | 52 (41) |
| Cobaltic acetoacetic ethyl ester | 110 | 12.5 (—) | 62.25 (—) | 40.5 (—) |
| Chromic glycinate | 120 | 14.2 (—) | 71 (—) | 39 (—) |
| Molybdenum (III) acetylacetonate | 120 | 15.0 (1.8) | 75 (9) | 54 (43) |

EXAMPLE 2

Mixtures, each composed of 20 parts of styrene, 0.1 part of manganic acetylacetonate and 0.1 part of a halogen compound are heated for one hour at 100° C. The yield of polymer is determined in each case by precipitating the polymer in methanol. The K-value is measured in a 1% solution in cyclohexanone. Y denotes the yield in parts, C the conversion in percent and K the K-value, in the following table:

Table 2

| Halogen compound | Y | C | K |
|---|---|---|---|
| Bromobenzene | 11.5 | 57.5 | 61 |
| Chlorobenzene | 8.5 | 42.5 | 70 |
| 1,3,5-trichlorobenzene | 10.35 | 52 | 72 |
| Cyanuric chloride | 11.70 | 58.5 | 65 |
| Trichloroethylene | 8.3 | 41.5 | 73 |
| 1,2-dibromoethane | 11.3 | 56.5 | 75 |
| Carbon tetrachloride | 13.05 | 65 | 79.5 |
| Pentachloropropanol | 15.55 | 77.5 | 78 |
| n-Amyl chloride | 18.0 | 90 | 81.0 |
| α-Bromocaproic acid | 14.8 | 74 | 58 |
| 2-amino-5-iodopyrimidine | 17.35 | 86.8 | 77 |
| Without halogen compound | 4.9 | 24.5 | 68 |

EXAMPLE 3

10 parts of manganic acetylacetonate and 10 parts of carbon tetrachloride are added to a mixture of 20,000 parts of benzene and 2000 parts of vinyl ethyl ether in a pressure vessel. Ethylene is forced in at room temperature to a pressure of 50 atmospheres gauge. The whole is then heated to 100° C. and ethylene is forced in until a pressure of 600 atmospheres gauge has been reached. After the polymerization has begun, the pressure falls; the pressure is kept at 600 atmospheres gauge by forcing in ethylene continually. The total duration of the polymerization is ten hours.

12,000 parts of a copolymer of 85% of ethylene and 15% of vinyl ethyl ether is obtained. This copolymer has a K-value of 38 and softens between 105° and 108° C.

EXAMPLE 4

112 parts of diisobutylene, 200 parts of cyclohexane, 60 parts of arcrylic acid, 0.1 part of manganic acetylacetonate and 0.1 part of hexachloroethane are heated at 100° C. for ten hours in a pressure vessel. 150 parts of a copolymer is obtained having a K-value of 115 (1% in 5% ammonia solution). The content of acrylic acid in polymerized form is 40% by weight.

EXAMPLE 5

76 parts of propylene, 200 parts of benzene, 5 parts of acrylamide, 50 parts of ethyl acrylate, 0.1 part of nickelous acetoacetic propargyl ester and 0.1 part of amyl chloride are heated for ten hours at 125° C. in a pressure vessel. 105 parts of a copolymer having a K-value of 76 (1% in dimethylformamide) is obtained.

The content of acrylamide in polymerized form is 4.7% by weight and of ethyl acrylate in polymerized form 42.5% by weight. The softening range of this copolymer is 45° C.

EXAMPLE 6

100 parts of styrene, 100 parts of vinyl chloride and 800 parts of benzene are mixed in a pressure vessel. 0.5 part of manganic anthranilate activated with amyl chloride is used as the initiator for the polymerization. To prepare the initiator, 0.5 part of manganic anthranilate is heated with 10 parts of amyl chloride for one hour at 45° C. Then the excess of amyl chloride is distilled off at 0.1 mm. Hg at 45° C. This activated initiator contains 0.5% by weight of chlorine. (The amyl chloride is incorporated into the crystal structure of the complex.) The polymerization mixture is heated for fifteen hours at 105° C. 165 parts of a copolymer having a K-value of 53 (1% in cyclohexanone/dimethylformamide 1:1) is obtained. The copolymer contains 39% by weight of vinyl chloride in polymerized form.

EXAMPLE 7

1000 parts of butadiene, 300 parts of dibutyl fumarate, 4000 parts of benzene, 1 part of manganic acetylacetonate and 5 parts of chloroform are heated for twenty hours at 100° C. in a pressure vessel. 520 parts of a copolymer is obtained having a K-value of 82 (1% in benzene).

EXAMPLE 8

80 parts of styrene, 20 parts of vinyl acetate, 0.5 part of cobaltic anthranilate and 0.5 part of 1,4-dichlorobutyne are heated for five hours at 110° C. in a pressure vessel. 95 parts of a copolymer is obtained having a K-value of 63 (1% in cyclohexanone).

This copolymer contains 16% by weight of vinyl acetate in polymerized form.

EXAMPLE 9

1000 parts of butadiene, 300 parts of acrylic acid, 1.0 part of nickelous acetylacetonate and 0.5 part of butyl chloride is heated for ten hours at 120° C. in a pressure vessel.

900 parts of a copolymer is obtained which contains 33% by weight of acrylic acid in polymerized form. This copolymer is crosslinked and swells in aqueous solution, in alcoholic solution and particularly in alkaline solution.

EXAMPLE 10

20 parts of styrene, 0.1 part of manganic acetylacetonate and 0.1 part of hexachloroethane are heated for ten hours at 70° C. 17 parts of polystyrene is obtained having a K-value of 85 (1% in cyclohexanone).

EXAMPLE 11

10 parts of cobaltic acetylacetonate is added to 8000 parts of cyclohexane in a pressure vessel and then 0.5 part of carbon tetrachloride is added. Ethylene is forced in up to a pressure of 1200 atmospheres gauge and polymerized for five hours at 150° C.

8400 parts of polyethylene is obtained having a K-value of 98 (1% in decahydronaphthalene) and a density of 0.945. If the polymerization is carried out without adding carbon tetrachloride, only 4600 parts of polymer is obtained.

EXAMPLE 12

1 part of cobaltic acetylacetonate and 10 parts of amyl chloride are added to 20,000 parts of benzene in a pressure vessel. Ethylene is forced in up to a pressure of 700 atmospheres gauge and polymerization carried on for ten hours at 125° C.

1200 parts of polyethylene is obtained having a K-value of 86.9 (1% in decahydronaphthalene) and a density of 0.919. The product contains 22 $CH_3$ groups and 0.17 vinylidene group for each 1000 carbon atoms. These values are determined by infrared measurements.

EXAMPLE 13

10 parts of cobaltic acetylacetonimide and 20 parts of carbon tetrachloride are added to 8000 parts of cyclohexane in a pressure vessel. Ethylene is forced in up to a pressure of 1300 atmospheres gauge and polymerization is carried on for five hours at 150° C.

7200 parts of polyethylene is obtained having a K-value of 91 (1% in decahydronaphthalene) and a density of 0.943.

EXAMPLE 14

1 part of manganic diacetoacetic ethyl ester and 5 parts of n-lauryl chloride is introduced into 1000 parts of benzene in a pressure vessel; 200 parts of butadiene is then forced in and polymerization carried on for five hours at 90° C.

100 parts of a polybutadiene is obtained having a K-value of 90.5 (1% in benzene). It dissolves free from gel and according to infrared analysis contains more than 50% of 1,4-cis-constituents.

By working as above with isoprene as the monomer, 95 parts of a polyisoprene is obtained which has a K-value of 87 (1% in benzene) and which dissolves without gel formation.

EXAMPLE 15

To 100 parts of methyl methacrylate and 100 parts of cyclohexane there is added at refluxing temperature in the course of some hours 0.5 part of cobaltic salicylaldehyde and 1 part of carbon tetrachloride. After working up and drying, 97 parts of polymethacrylate is obtained having a K-value of 84.5 (1% in dioxane).

EXAMPLE 16

A mixture of 1 part of manganic ortho-aminophenolate and 5 parts of chloroform is stirred for one hour at 40° C. Then 50 parts of vinylisobutyl ether is allowed to drip in and the whole is heated for three hours at refluxing temperature. 9.1 parts of polyvinylisobutyl ether is obtained having a K-value of 38 (1% in tetrahydrofurane.)

By following the above procedure but using antimony (V) tetrachloroacetylacetonate as catalysts, the yield is 27.2 parts of polyvinyl isobutyl ether having a K-value of 61. Carrying out the same procedure with titanium (IV) dichloroacetylacetonate as catalyst, the yield is 29.5 parts of polyvinyl isobutyl ether having a K-value of 58.5.

EXAMPLE 17

10 parts of acrylic acid, 0.1 part of manganic acetylacetonate and 0.2 part of carbon tetrachloride are mixed. Spontaneous polymerization takes place at room temperature within a few minutes with yields of 85% by weight of polyacrylic acid. The K-value of this product is 118 (0.5% in 5% ammonia solution).

EXAMPLE 18

10 parts of acrylamide, 0.1 part of cobaltic chloromalonodialdehyde and 0.2 part of bromoform are mixed. Spontaneous polymerization takes place within a few minutes at room temperature with yields of 83% by weight of crosslinked polyacrylamide.

EXAMPLE 19

A solution of 50 parts of N-methylolmethacrylamide in 100 parts of benzene is mixed with a mixture of 0.1 part of vanadium (III) acetylacetonate, 0.1 part of manganic acetoacetic ester and 0.5 part of n-amyl chloride and the whole polymerized for five hours at 80° C. 48 parts of polymer is obtained which has a K-value of 49 (0.1% in ethanol).

Under the same conditions, N-vinylimidazole and N-vinylcarbazole are polymerized. The yields are 38 and 42 parts by weight of polymer.

EXAMPLE 20

A mixture of 0.1 part of manganic 2,2-hydroxyazobenzene and 0.5 part of methylene chloride which has previously been heated for an hour at 25° C., is added to a solution of 10 parts of acrylonitrile in 90 parts of styrene, and the whole is polymerized at 45° C. for six hours. 65 parts of a copolymer is obtained having a K-value of 86 (1% in toluene) and containing 7.5% by weight of acrylonitrile in polymerized form.

We claim:

1. A process for the production of polymers of ethylenically unsaturated monomeric polymerizable compounds wherein the ethylenically unsaturated monomeric compound is contacted with a catalyst consisting essentially of the following components:
   (a) a metal chelate compound of a metal selected from Groups IVB, VA, VB, VIB, VIIB and VIII of the Periodic System of Elements and a member selected from the group consisting of β-diketone, β-ketocarboxylic ester, ester of diacetoacetic acid, amino acid having two to six carbon atoms, salicylaldehyde, chloromalonodialdehyde, o-aminophenol, o-aminobenzoic acid and 2,2'-hydroxyazobenzene and
   (b) a member selected from the group consisting of an aliphatic, aromatic and heterocyclic chlorine, bromine and iodine compound having one to twelve carbon atoms, and wherein component (a) is present in an amount of between 0.001 and 5% by weight with reference to the monomeric compounds, and wherein component (b) is present in the amount of from 0.01 to 50 parts by weight to 1 part of component (a).

2. A process as claimed in claim 1, wherein an additional ethylenically unsaturated monomeric polymerizable compound is used.

3. A process as claimed in claim 1 wherein the ethylenically unsaturated monomeric polymerizable compound is an α-olefine having two to ten carbon atoms and one to two olefinic double bonds.

4. A process as claimed in claim 2 wherein the ethylenically unsaturated monomeric polymerizable compound is an α-olefine having two to ten carbon atoms and one to two olefinic double bonds.

5. A process as claimed in claim 1 wherein the ethylenically unsaturated monomeric polymerizable compound is mixed with an auxiliary liquid for the polymerization.

6. A process as claimed in claim 2 wherein the ethylenically unsaturated monomeric polymerizable compound is mixed with an auxiliary liquid for the polymerization.

References Cited by the Examiner

UNITED STATES PATENTS 3,081,287  3/1963  Coover _____ 260—93.7

FOREIGN PATENTS 790,399  2/1958  Great Britain.

JOSEPH L. SCHOFER, *Primary Examiner.*

F. L. DENSON, *Assistant Examiner.*